United States Patent
Balabine et al.

(10) Patent No.: US 12,124,970 B2
(45) Date of Patent: Oct. 22, 2024

(54) METHOD, APPARATUS, AND COMPUTER-READABLE MEDIUM FOR POSTAL ADDRESS INDENTIFICATION

(71) Applicant: Informatica LLC, Redwood City, CA (US)

(72) Inventors: Igor Balabine, Menlo Park, CA (US); Dina Laevsky, Rehovot (IL)

(73) Assignee: Informatica LLC, Redwood City, CA (US)

(*) Notice: Subject to any disclaimer, the term of this patent is extended or adjusted under 35 U.S.C. 154(b) by 772 days.

(21) Appl. No.: 17/229,416

(22) Filed: Apr. 13, 2021

(65) Prior Publication Data
US 2022/0327403 A1     Oct. 13, 2022

(51) Int. Cl.
*G06F 17/00* (2019.01)
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC ............. G06N 5/04; G06N 20/00; G06N 7/01
See application file for complete search history.

(56) References Cited

U.S. PATENT DOCUMENTS

| | | | | |
|---|---|---|---|---|
| 7,454,192 B1* | 11/2008 | Zhu | ...................... | G06F 16/9537 455/406 |
| 8,682,898 B2* | 3/2014 | Joshi | ...................... | G06F 40/247 707/737 |
| 10,134,202 B2* | 11/2018 | Schleicher | ....... | G07B 17/00435 |
| 10,504,051 B2* | 12/2019 | Oba | .................. | G06F 16/90344 |
| 2005/0021551 A1* | 1/2005 | Silva | .................... | G06F 16/2468 707/999.102 |
| 2008/0184064 A1* | 7/2008 | Wu | ...................... | G11C 29/808 714/6.2 |
| 2017/0206500 A1* | 7/2017 | Deshpande | ...... | G06Q 10/08345 |

* cited by examiner

*Primary Examiner* — Greta L Robinson
(74) *Attorney, Agent, or Firm* — Reed Smith LLP; Amardeep S. Grewal

(57) ABSTRACT

An apparatus, computer-readable medium, and computer-implemented method for postal address identification, including receiving one or more sequences of tokens corresponding to candidate postal address data objects, evaluating the sequences of tokens with the statistical postal address model to identify candidate postal address data objects, computing candidate vectors corresponding to the identified candidate postal address data objects in the vector space, and determining whether the identified candidate postal address data objects correspond to a postal address based on applying outlier detection methods to the candidate vectors and one or more clusters of the clusters.

24 Claims, 9 Drawing Sheets

Fig. 7

METHOD, APPARATUS, AND COMPUTER-READABLE MEDIUM FOR POSTAL ADDRESS INDENTIFICATION

BACKGROUND

Postal addresses are an important component of Personally Identifiable Information (PII) as stipulated by a growing number of privacy legislations such as the European Union General Data Protection Regulation (GDPR) and the California Computer Privacy Act (CCPA). While postal addresses are ubiquitous in both databases and unstructured documents, they are frequently structurally complex and difficult to identify. Although national postal organizations issue regulations on the structure and content of local postal addresses, the rules are typically not followed consistently and therefore have limited utility.

Typically, postal address processing is comprised of two phases: the discovery phase and the validation phase. The discovery phase identifies a data object which matches an accepted postal address model. During the validation phase, previously discovered data objects are looked up in a database of postal addresses to validate that they are actually postal addresses.

The accuracy of the postal address validation phase depends largely on the content used for validation, such as the database of confirmed postal addresses. There are several postal address validation tools, such as Informatica "Address Doctor" (AD) product which is officially certified by a number of international postal organizations for postal address validation. The AD tool utilizes a very large—tens of gigabytes—database of known postal addresses for matching the candidate data objects.

However, discovery of a postal address in either structured or unstructured data is far more difficult than postal address validation. An address discovery system must be able to detect the presence of a postal address anywhere within unstructured or structured data with a reasonable degree of probability and must do so for a variety of different address types and formats.

BRIEF DESCRIPTION OF THE DRAWINGS

FIG. 7 illustrates an example of application of the scoring system and the effect of Bayesian surprise according to an exemplary embodiment.

DETAILED DESCRIPTION

While methods, apparatuses, and computer-readable media are described herein by way of examples and embodiments, those skilled in the art recognize that methods, apparatuses, and computer-readable media for postal address identification are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

Applicant has discovered a novel method, apparatus, and computer-readable medium for postal address data object identification in unstructured, semi-structured, and structured data sources that utilizes a uniform logical model of a postal address and combines frequentist and the Bayesian statistical methods to identify components of the logical model.

The present system involves a training step, in which the probabilities of various characteristics of a postal address across different geographies are computed based on publicly available data. In a subsequent step the computed probabilities are used when assessing new and never-before-seen postal address objects candidates. By considering individual components of the logical postal address model as coordinates of a vector in a multi-dimensional space, the vectors representing individual addresses from a training set are grouped in several clusters.

After training, the system applies an identification step to each discovered postal address candidate object, computes a vector corresponding to each address candidate object, and performs an estimate of the address candidate object's fitness. This novel approach allows for the assessment of anomalous postal address objects candidates by computing Bayesian surprisal of imputed syntactic markers found in the address candidate objects.

During a matching step candidate objects accepted by the identification step are matched with the computed clusters using a variety of outlier detection methods. Candidate objects assessed as outliers are rejected and the matching candidate objects are accepted as postal address objects.

Figure 1:
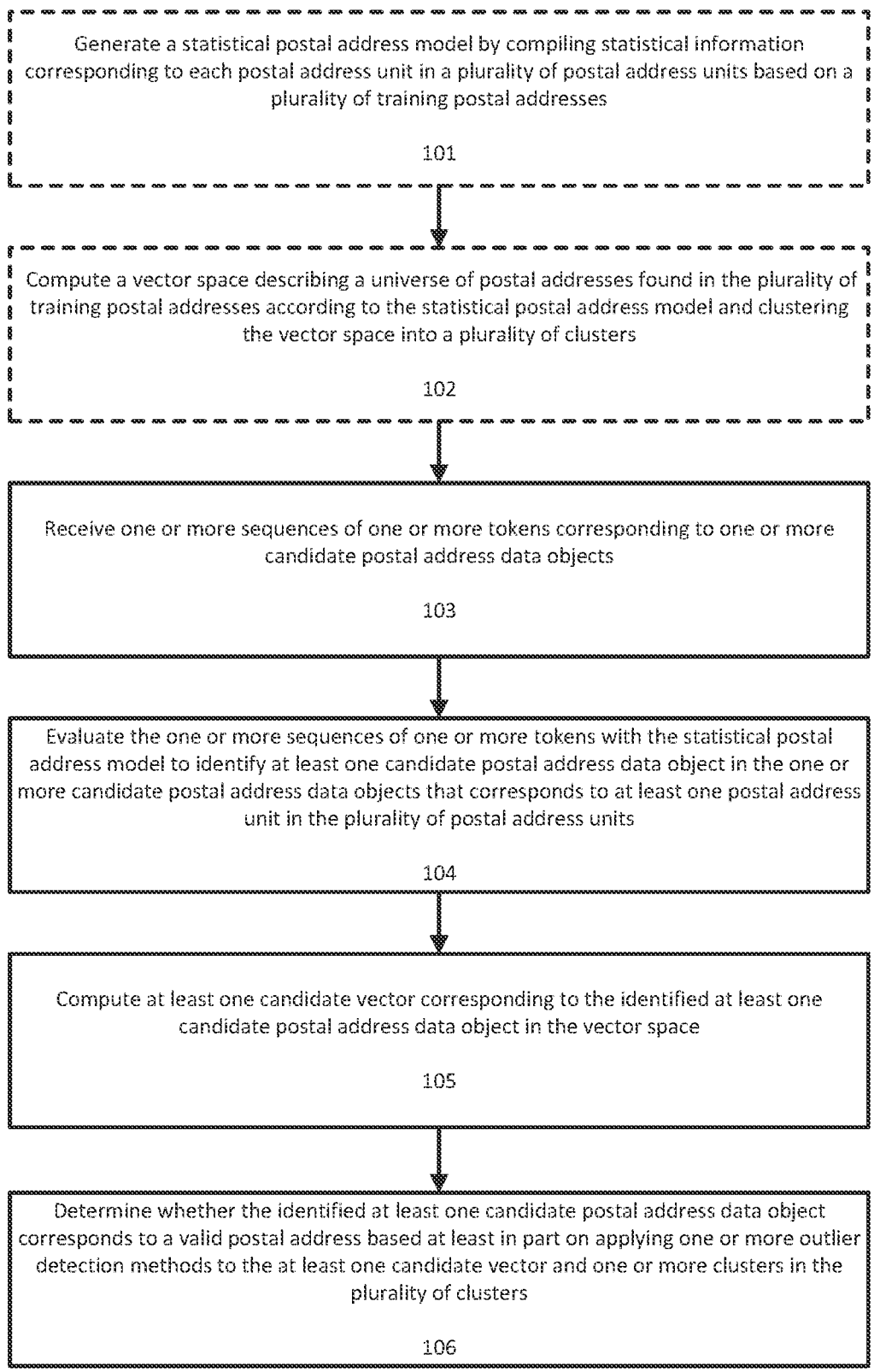
FIG. 1 illustrates a flowchart for postal address identification according to an exemplary embodiment.

FIG. 1 illustrates a flowchart for postal address identification according to an exemplary embodiment. Steps 101 and 102 relate to the process of generating a statistical postal address model and computing a vector space based upon training postal addresses. As indicated by the dashed lines, these steps are optional and are not required to be repeated for every instance of postal address identification. For example, a statistical postal address model and vector space can be computed initially and then steps 103-106 can be repeated to perform postal address identification for multiple different sequences of tokens, without having to repeat steps 101-102.

At step 101 a statistical postal address model is generated by compiling statistical information corresponding to each postal address unit in a plurality of postal address units based on a plurality of training postal addresses.

Each postal address unit corresponds to a distinct element of a postal address, such as street, city, or house number. The plurality of postal address units can include, for example, a number, a street, a city, a district, a region, a postcode, a country, and/or a wildcard unit.

Figure 2:
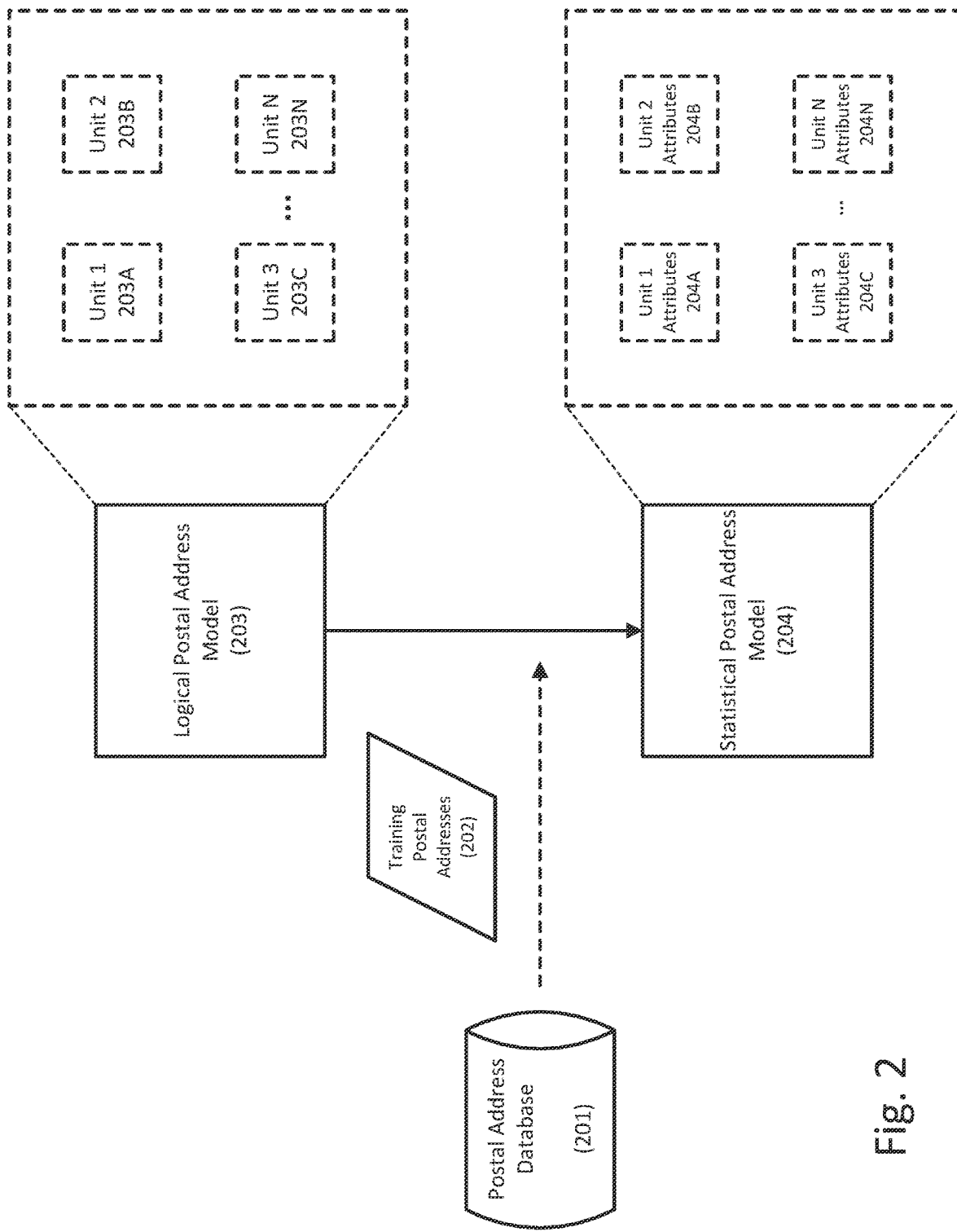
FIG. 2 illustrates a system diagram for generating a statistical postal address model according to an exemplary embodiment.

FIG. 2 illustrates a system diagram for generating a statistical postal address model according to an exemplary embodiment. The starting point for generating the statistical postal address model is a logical postal address model 203. The logical postal address model 203 can include a plurality of postal address units, such as Unit 1 203A, Unit 2 203B, and Unit 3 203C up to Unit N 203N, where N is any positive number.

Figure 3:
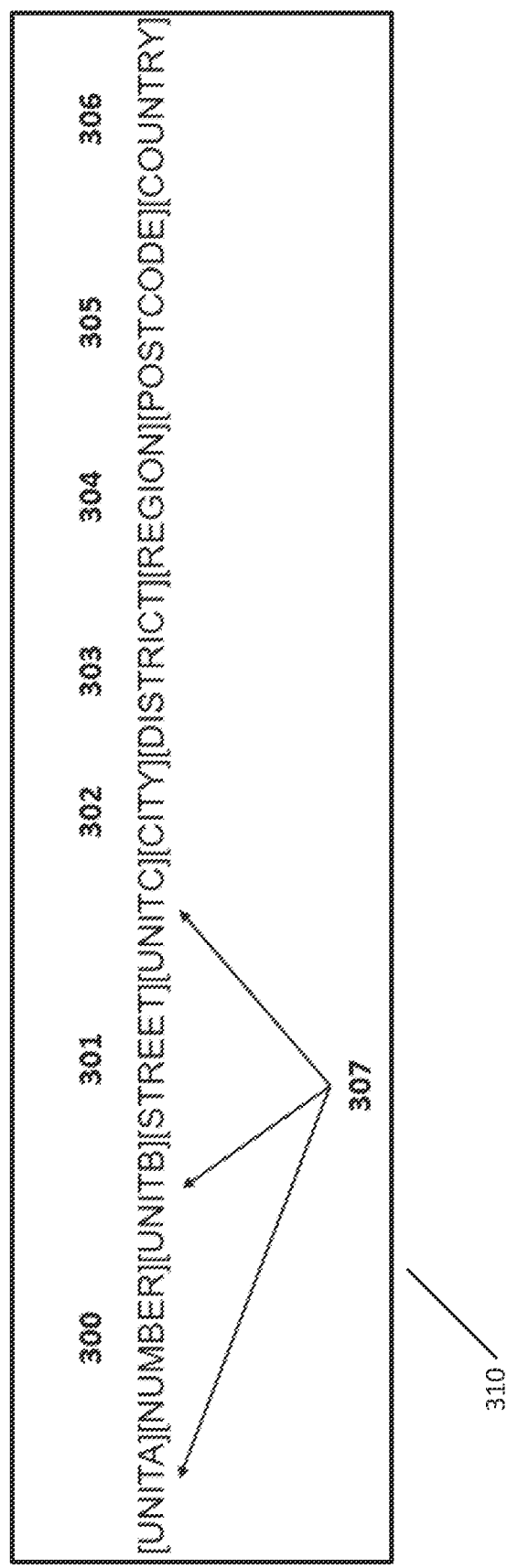
FIG. 3 illustrates postal address units of a postal address model according to an exemplary embodiment.

FIG. 3 illustrates postal address units of a postal address model according to an exemplary embodiment. The postal address model shown in FIG. 3 includes the following postal address units:

Number 300— a designator of a dwelling or a land parcel (e.g. 12345, 8½, Lot #67).

Street 301— a designator of a tract associated with Number 300 (e.g. Main Street, Rue de la Paix).

City 302— a designator of an urban area associated with Street 301 (e.g. Menlo Park, Tel Aviv).

District 303— a designator of a locality associated with City 302 (e.g. San Mateo County, Yorkshire).

Region 304— a designator of a locality associated with District 303 (e.g. California, Normandy).

Postcode 305—a group of numbers or letters and numbers which are added to a postal address to assist the sorting of mail (e.g. 90210, W1A 0AX).

Country 306—a nation with its own government, occupying a particular territory (e.g. Norway, Italy).

Secondary optional designators 307—referred to as "wildcard" postal address units. In this example, Unit A, Unit B, and Unit C are wildcard units. Secondary optional designators can be associated with the Number 300 or Street 301 and/or other postal address or be specific to a locality (e.g. Suite #200, "A door after $3^{rd}$ cow"). The wildcard unit 307 can occur in zero, one or a plurality of locations throughout a candidate postal address data object.

The above model is derived from the postal address regulations issued by respective national postal authorities such as USPS in the US, La Poste in France, Deutsche Post in Germany, Japan Post in Japan, etc. The model can be customized to various the national postal address models using regulatory information issued by the respective authorities and other authoritative sources. It is important to note that any of the elements included in the above postal address model can be absent except those which comprise a minimal postal address designated by a national postal authority.

Further referring to FIG. 3, it is appreciated that introduction of a versatile Unit 307 feature creates additional degrees of freedom for the postal address data object. The three possible positions (UnitA, UnitB, UnitC) of the Unit 307 feature, indicated in the model depicted in FIG. 3, are exemplary. There may be zero or more Unit 307 features in a postal address data object.

The logical postal address model defines the structure, format, syntax, and/or metadata relating to each of the postal address units. The initial logical postal address model can take a variety of forms and can be customized to a particular locality. For example, a logical postal address model customized to the US can define a zip code postal address unit and a logical postal address model in other countries can define a different postal code address unit having a different format (e.g., number of characters, alphabet, range, etc.).

Returning to FIG. 2, a postal address database 201 is used as a source for training postal addresses 202. The postal address database 201 can be any type of database or data repository, including a structured data repository, an unstructured data repository, and/or a semi-structured data repository. The training postal addresses 202 are then used, in conjunction with the logical post address model 203, to generate the statistical postal address model 204. Specifically, the statistical postal address model 204 is generated by compiling statistical information corresponding to each postal address unit in a plurality of postal address units (defined in the logical postal address model 203) based on the plurality of training postal addresses 202.

The statistical postal address model 203 includes one or more attributes corresponding to each postal address unit. As shown in FIG. 2, the statistical postal address model 204 includes Postal Address Unit 1 Attributes 204A, Postal Address Unit 2 Attributes 204B, Postal Address Unit 3 Attributes 204C . . . up to Postal Address Unit N Attributes 204N, where N is any positive number corresponding to the number of postal address units. Attributes are discussed in greater detail further below.

The step of generating a statistical postal address model by compiling statistical information corresponding to each postal address unit in a plurality of postal address units based on a plurality of training postal addresses can include determining one or more values of one or more features of each postal address unit based at least in part on the plurality of training postal addresses, and determining one or more probability values for one or more attributes associated with each postal address unit based at least in part on the determined one or more values.

The following example illustrates the statistical postal address model generation process using the United States postal addressing system. However, it is understood that the overall technique of compiling statistical information corresponding to postal address units using training postal addresses can be applied to any type of addressing system.

As shown in FIG. 3, the US Postal Service regulations establish a standard postal address comprised of Number 300, Street 301, City 302, Region 303 (state) and Postcode 305 (ZIP code). For example, "2100 Seaport Boulevard, Redwood City, CA 94063" represents a standard US postal address. A minimal postal address, sufficient for mail delivery in the US, is an extended form of the Postcode 305, called "ZIP+4".

In the exemplary address model previously discussed, the Unit 307 element is a wildcard/placeholder for a custom extension of the standard postal address model. The Unit 307 element may be something as simple as "Suite #200," or "Apartment 3C," and may be as complex as "Sixth Floor, Andrew Johnson Tower, Suite 604A." Importantly, any of the above model elements may be absent but the remaining elements still constitute a valid postal address. For example: "PO BOX181 CLINTON CT 06413" or "Pago Pago, American Samoa, 96799." These examples of a postal address omit the Number 300 and the Street 301 components.

Although some components of the postal addresses may be omitted, there may be plentiful additional information present. For example: "ROOM 229 STATE HOUSE 200 W WASHINGTON STREET INDIANAPOLIS INDIANA 46204-2798" or "P.O. Box 1402, Townsend Building Suite 2."

Every machine learning algorithm requires data, and in the postal address domain, the information is plentiful. The following official documentation provided by USPS can be used as training data:

Tables of street names suffixes (e.g. ROAD, PLAZA) and abbreviations (e.g. RD, PLZ);

Tables of directional markers (e.g. NE, WEST);
Tables of unit designators and abbreviations (e.g. APT, TOWER); and
Table of US States, US possessions names and abbreviations.

Databases of US cities and toponyms are widely available with the largest containing 1.2M+ unique entries (geonames.org). A well-structured database of the US postal addresses is available from openaddresses.io. The latter address database is split in 4 subsets: North East, Mid-West, South and West with a total number of approximately 140M samples which can be used to create the frequentist statistical model of the postal address discussed in this application. Statistics are collected in each subset and then weighted averages can be computed based on the number of entries in each of the geographies.

The frequentist statistical model used in the computations can be based on the following components Number 300, Street 301, Unit 307, City 302, Region 304 and Postcode 305. The District 303 generic model element is almost never used in the US postal addresses and thus is not included in the statistical model features list. Since all postal addresses under consideration are the US postal addresses, the Country 306 generic model element is not a feature of the statistical model.

As discussed above, the generation of the statistical postal address model includes determining one or more values of one or more features of each postal address unit based at least in part on the plurality of training postal addresses. Statistics are compiled regarding the quantity of postal address units that have different values of each feature and these statistics are then used to determine probability values for attributes associated with each postal address unit.

The features of each postal address unit for which statistics are compiled can include the following features for each postal address unit:

Number 300:
 Tokens count in a number
 Digits count—the number of digits in the dwelling number
 Count of dwelling numbers starting with 0
 Count of dwelling numbers which contain characters other than digits and fractional dwelling numbers
Street 301:
 Tokens count in a street name
 Street name suffix position
 Street name directional designator position
 A number position in a street name (e.g. "Old Highway 99 N")
Unit 307:
 Tokens count in a unit designator
 Unit designator position
 Known pattern, such as a number, one or more letters, a range, position
 Presence of a pattern count
City 302:
 Tokens count
Region 304:
 Tokens count
Postcode 305:
 Digits and symbols count
 Known pattern, such as a separator, position Tokens can include characters such as alphanumeric characters, special characters (e.g, #-;$* . . . ), or sequences of characters, such as strings or words. The compiled statistics for each of the features are then used to determine one or more probability values for one or more attributes associated with each postal address unit.

It is appreciated that features other than those described above can be utilized. For example, the Postcode 305 component may be further decomposed, and its first two digits may also be included in the collected statistic.

Attributes are characteristics of the data set corresponding to each postal address unit and in the statistical model can be expressed as probability values indicating the likelihood that an address in the data set has a particular feature value of a feature of the postal address unit. For example, attributes for the Number 300 postal address unit can include:

Attribute 1: Probability of 1 Token;
Attribute 2: Probability of 2 Tokens;
Attribute 3: Probability of 3 Tokens;

In this case, the underlying feature of the Number 300 postal address unit is the tokens count and each of the above attributes expresses the probability of a postal address in a data set of postal addresses having a Number 300 with a specific number of tokens. The probability values are determined based upon the observed feature values in the training data set. For example, given the a training postal address data set with 5 addresses in which the Number 300 postal address unit is:

(1) "313" (3 tokens)
(2) "511" (3 tokens)
(3) "12-31" (5 tokens)
(4) "1449" (4 tokens)
(5) "45" (2 tokens)

The following probability values for the following attributes of the Number 300 postal address unit would be determined:

Attribute 1: Probability of 1 Token=0
Attribute 2: Probability of 2 Tokens=20%
Attribute 3: Probability of 3 Tokens=40%

The probability values of each attribute describe the postal address statistical model and are subsequently utilized to identify candidate addresses. The postal address statistical model includes a plurality of component statistical models corresponding to the plurality of postal address units. In other words, a component statistical model is generated for each component (e.g., a model for Address Number, a model for Address Street, a model for Address City).

The example above assumes that tokens are identified on a per-character basis, but other variations are possible. For example, tokens can be identified as strings comprising sequences of characters, separated by some type of delimiter, such as a space or hyphen.

For example, the following attributes can be compiled as part of the component statistical model for the Street 301 postal address unit:

probability of a certain count of tokens in a street name (1 to max)
 probability of a street name suffix being at a certain position
 probability of a street name directional designator being at a certain position
 probability of a number in a street name being at a certain position These probability values describe the component statistical model for the Street 301 postal address unit. Once the attributes for all features in the postal address unit are computed, the features' attributes are combined in a single entity which represents a statistical model of the universe of discourse. This step is explained further below with respect to the process for evaluating sequences of tokens to identify candidate postal address data objects.

Returning to FIG. 1, at step 102 a vector space describing a universe of postal addresses found in the plurality of training postal addresses according to the statistical postal address model is computed and the vector space is clustered into a plurality of clusters.

The vector space comprises a plurality of dimensions corresponding to the multiple features of each postal address unit. Each dimension corresponds to a different feature of a particular postal address unit. For example, given a Street 301 postal address unit statistical model having the following features:

Tokens count in a street name
Street name suffix position
Street name directional designator position
A number position in a street name (e.g. "Old Highway 99 N")

The vector space can include four separate dimensions corresponding to each of these features. Each dimension would correspond to a different feature. For example, the "tokens count in a street name" would increment 1, 2, 3, etc.

The total number of dimensions for the vector space can be determined based upon the features for each postal address unit and the total number of postal address units. For example, if the training data includes addresses having 4 separate postal address units and each of these postal address units has 3 features, then the total number of dimensions in the vector space would be 4×3=12.

The vector space comprises multiple training vectors corresponding to multiple training postal addresses in the plurality of training postal addresses. Each training vector corresponds to a different training postal address and plots the feature values of that training postal address within the universe of discourse, as defined by the statistical postal address model. For example, a training vector for the Street 301 postal address unit shown above could have the values corresponding to the features <Tokens count in a street name, Street name suffix position, Street name directional designator position, A number position in a street name>. In this case, a street name of "Rittenhouse St" would have vector values have the values <14, 13, 0, 0>, since there are 14 tokens (counting the white space), the suffix begins at position 13, and there are no numbers or directional designators.

The vector space can optionally include all or nearly all of the training postal addresses in the plurality of training postal addresses. Alternatively, to save resources and improve processing time, a subset of the plurality of training postal addresses can be selected and plotted as the training vectors in the vector space. The subset of training postal addresses can be randomly selected so that they accurately represent the distribution of the plurality of training postal addresses. For example, given a training set with more than a hundred million postal addresses, 30 million postal addresses can be selected and evaluated with the statistical postal address model, resulting in a vector space with 30 million training vectors.

Optionally a number of dimensions in the training postal address data can be reduced by removing data corresponding to one or more features of one or more postal address units in the plurality of postal address units. This process is configured to find important features in the postal address units and discard other features which equate to noise in the multidimensional vector space, thus reducing dimensionality of the overall vector space.

Reducing the number of dimensions in the training data achieves speed up of subsequent clustering steps by engaging the Principal Components Analysis ("PCA") method which reduces the number of the data object's dimensions as compared to the number of data object's dimensions in the original universe of discourse. The PCA input data dimensionality reduction method transforms input data coordinates in such way that eigenvectors of the covariance matrix become new coordinate axis.

While PCA merely transforms the coordinate system, the actual data dimensionality reduction procedure can be achieved by employing Horn's Parallel Analysis ("PA") technique.

PA is based on comparing eigenvalues of an actual data set with eigenvalues of an artificial data set of uncorrelated normal variables of the same dimensionality as the actual data set. While dimensionality of the actual data set is known upfront the size of the training data set is variable and cannot be predicted. Due to the data set size variability, a pre-generated table of uncorrelated normal variables eigenvalues can be used when performing the PCA procedure at run-time. A table of uncorrelated normal variables eigenvalues can be generated offline and can be interpolated at runtime.

Of course, techniques other than the combination of the PCA and PA methods can be used to reduce data dimensionality of the training data. For example, the Linear Discriminant Analysis method or the Sufficient Dimensionality Reduction approach can also be used to achieve the objective of reducing dimensionality.

Regardless of whether dimensionality is reduced, the vector space is clustered into a plurality of clusters. The clustering step groups the multiple training vectors into groupings of training vectors, known as clusters. Each cluster includes a group of training vectors which correspond to postal addresses having similar or proximate sets of values for features of the postal address units.

A variety of techniques can be used for clustering the training vectors. For example, the density-based spatial clustering of applications with noise (DBSCAN) clustering method can be used due to anticipated presence of non-convex subspaces in the resulting vector space.

Clustering can also be performed using the Balanced Iterative Reducing and Clustering using Hierarchies ("BIRCH") method to cluster the training vectors. BIRCH is a robust clustering algorithm developed for analyzing large volumes of multivariate data. The algorithm is capable of ingesting input data in a continuous fashion. The clustering step includes four steps, described below.

The first step is building a Clustering Feature ("CF") tree—during this stage input data is loaded into a B-tree like structure and data objects are agglomerated in the leaf nodes based on relative Euclidean distance between the data objects. Data objects merging threshold is an input parameter of the BIRCH algorithm and is set initially to a small value. When the input data is normalized to the [0, 1] interval, a relatively small merging threshold value, such as 0.0001 can be used. Additionally, as discussed below, the threshold value can be automatically corrected during a subsequent intermediate step.

The second step is CF tree condensing—this operation can be triggered when the CF tree exceeds a preset size. At this time the samples merging threshold can be recomputed and the CF tree can be rebuilt. A new value of the merging threshold can then be derived from the distance between entries in the existing CF tree.

The third step is global clustering—at this step the BIRCH clustering algorithm applies a regular clustering algorithm to information collected in the CF tree. For example, the BIRCH algorithm implementation can utilize two global clustering options: CF tree refinement and Hierarchical Clustering ("HC"). While HC is capable of producing finer granularity clusters, its run time is significantly longer and memory consumption is significantly higher than that of the CF tree refinement procedure.

The fourth step is cluster matching—during this step input data objects are matched with the clusters produced after the refinement step.

Additionally, clustering methods other than DBSCAN or BIRCH can be used during the clustering step. For example, clustering algorithms such as K-means or DENGRIS can be used to group the training vectors into clusters.

Figure 4:
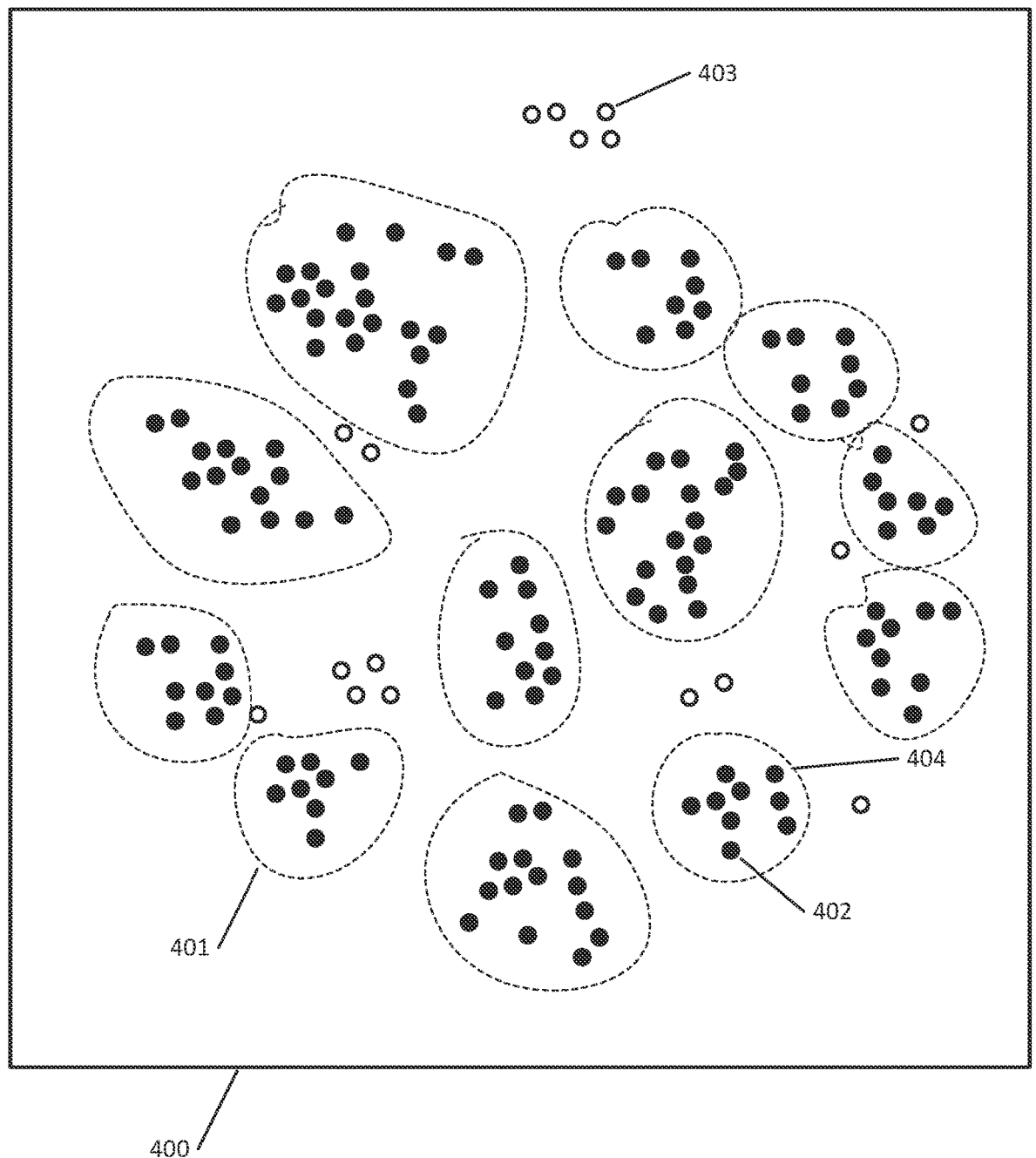
FIG. 4 illustrates an example of a vector space of postal addresses according to an exemplary embodiment.

FIG. 4 illustrates an example of a vector space 400 of postal addresses according to an exemplary embodiment. For clarity of illustration, the vector space is shown as a two dimensional vector space, but it is understood that the vector space can have any number of dimensions, corresponding to the features of each postal address units, as discussed above. For example, the vector space can have anywhere from 2-500 dimensions.

The vector space 400 include a plurality of training vectors, such as training vectors 402 and 403. Each training vector corresponds to a different training postal address in the plurality of training postal addresses in the training set. FIG. 4 also illustrates the clusters produced by the clustering process, such as cluster 401. As shown in FIG. 4, the training vectors are distributed among 12 distinct clusters. Some training vectors, such as training vector 402, are part of a cluster. Other training vectors, such as training vector 403 are outliers and likely noise in the training data set. In line with expectations, discovered agglomerations of the training vectors are not convex. Vectors belonging to a cluster are shown in black and vectors falling outside of a cluster are shown in white.

An advantage of the disclosed statistical model is its small size. For example, a statistical postal address model built with 30 million training postal addresses, as discussed before, has a size of only a few (8.5) kilobytes. The small footprint of the model makes it suitable for deployment in computing environments with limited resources. This is a significant benefit as compared to the existing technologies which require at least a few megabytes for the lookup tables.

After the generation of the statistical model and the vector space, the system can then use the statistical model and the vector space to perform a postal address discovery process.

Returning to FIG. 1, at step 103 one or more sequences of one or more tokens corresponding to one or more candidate postal address data objects are received. This step can include ingesting, parsing, and/or retrieving data from a data repository or other data source, such as a structured database or unstructured or semi-structured data source.

Figure 5:
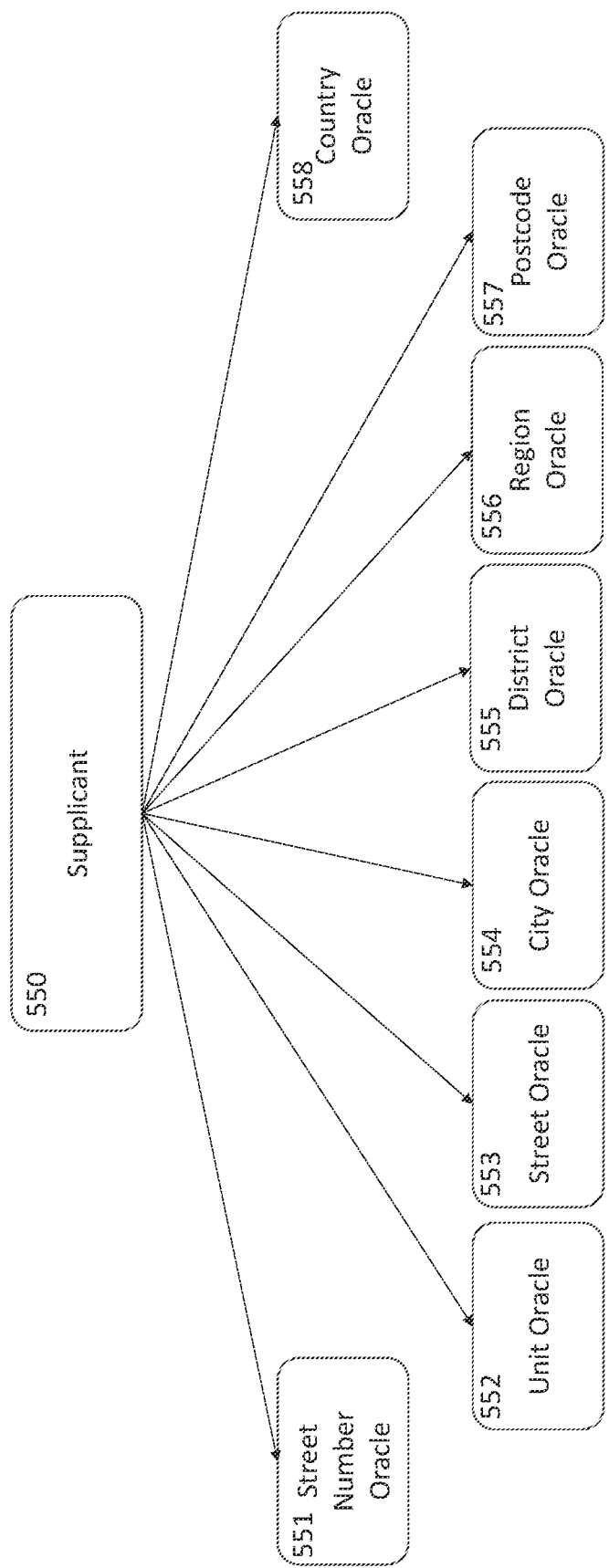
FIG. 5 illustrates oracle subcomponents of a supplicant component according to an exemplary embodiment.

A supplicant component is used to identify which sequences of tokens correspond to potential postal addresses and which sequences of tokens correspond to particular postal address units (e.g., street, number, etc.). FIG. 5 illustrates the supplicant component 550 and oracle subcomponents of the supplicant component 550 according to an exemplary embodiment.

The supplicant component 550 itself is a Postal Address (PA) Oracle which processes sequences of characters and determines which overall sequence of characters likely corresponds to a postal address, as well as which sequences of characters correspond to postal address units within that postal address.

For example, in the scenario where the supplicant component 550 is looking for a number, a state name, or a city name, it can perform the step of scanning for markers indicative of an address or a postal address unit, such as Street or Avenue abbreviation or a 5 digit number without commas. When it sees one of the markers it can check the surrounding information for other indicators of a postal address. The supplicant component makes a rough prediction regarding where a potential address sequence starts (e.g. a number which may be a house number) and then proceeds querying each of its component Oracles while moving/parsing through the sequence of tokens.

As shown in FIG. 5, the supplicant component 550 communicates with a collection of subcomponents, each of which is responsible for deciding if a data object (e.g., a sequence of tokens) presented to it, represents a particular type of postal address unit that is assigned to that subcomponent. The term oracle is used herein to describe supplicant component 550 and each of the subcomponents, but it is understood that other terms can be used. The supplicant component and each of the subcomponent oracles can include pattern matching software or hardware, lexical analysis and natural language processing software or hardware, and/or other types of hardware or software used to identify and recognize sequences of token potentially corresponding to each of the postal address units.

Referring to FIGS. 3 and 5, the collection of subcomponents includes:

Street Number Oracle 551— a subcomponent responsible for identifying a Street Number 300 element in a postal address;

Unit Oracle 552—a subcomponent responsible for identifying a Unit 307 element in a postal address;

Street Oracle 553—a subcomponent responsible for identifying a Street 302 element in a postal address;

City Oracle 554—a subcomponent responsible for identifying a City 302 element in a postal address;

District Oracle 555—a subcomponent responsible for identifying a District 303 element in a postal address;

Region Oracle 556—a subcomponent responsible for identifying a Region 304 element in a postal address;

Postcode Oracle 557—a subcomponent responsible for identifying a Postcode 305 element in a postal address;

Country Oracle 558—a subcomponent responsible for identifying a Country 506 element in a postal address;

The Supplicant 550, based upon its analysis, passes one or more tokens which comprise a postal address unit candidate to one or more Oracle subcomponents. Upon receiving said collection of tokens, the Oracle examines the proposed collection and responds to the Supplicant 550 with a value characterizing the Oracle's confidence that a proposed sequence of tokens represents a postal address unit within the Oracle's domain of expertise.

For example, the PA Oracle (the Supplicant 550) can takes a token which is a number T1 and pass it to the Street Number Oracle. The Street Number Oracle returns a confidence C1. Then the PA Oracle passes the number token and the adjacent token T2 to the Street Number Oracle. The Street Number Oracle returns a confidence C2<C1. The PA Oracle can then conclude that T1 is a candidate to be a street number. Next the PA Oracle takes token T2 and passes it to the Street Name Oracle. The process then repeats until the sequence of tokens are processed. In this way the PA Oracle splits the sequence into the oracle components.

In the situation when a subcomponent oracle does not recognize a sequence of tokens as a data object in its domain of expertise (e.g., a postal address unit that the oracle is configured to recognize), the oracle can return a zero value. In the event that a subcomponent oracle does recognize a sequence of tokens as a data object in its domain of expertise, the oracle returns a non-zero value.

Applicant notes that the specific markers which the Supplicant 550 (PA Oracle) uses to identify potential postal addresses and postal address units and the order in which it queries the component Oracles are locality specific. These parameters can configured by the user and/or based upon the specific locality.

Returning to FIG. 1, at step 104 the one or more sequences of one or more tokens are evaluated with the statistical postal address model to identify at least one candidate postal address data object in the one or more candidate postal address data objects that corresponds to at least one postal address unit in the plurality of postal address units. As discussed previously, each postal address unit corresponds to a distinct element of a postal address.

This step includes, for each sequence of one or more tokens (e.g., each potential postal address unit):

Sub-Step 1: computing one or more weights associated with the sequence of one or more tokens and corresponding to one or more attributes of the at least one postal address unit;

Sub-Step 2: computing one or more surprisal factors associated with the sequence of one or more tokens and corresponding to one or more attributes of the at least one postal address unit;

Sub-Step 3: computing an overall weight associated with the sequence of one or more tokens based at least in part on the one or more weights and the one or more surprisal factors; and Sub-Step 4: identifying the sequence of one or more tokens as corresponding to the at least one postal address unit based at least in part on the overall weight.

Each of these steps are described in greater detail below with multiple examples, such as the example shown in FIG. 6, which illustrates an example of evaluating sequences of tokens with the statistical postal address model according to an exemplary embodiment.

As explained below, the use of surprisal as part of the step of evaluating the one or more sequences of tokens with the statistical postal address model accommodates for irregularities that can occur in postal addresses.

Postal addresses are ubiquitous in both structured and unstructured data sources. During the postal address discovery phase, each of the postal address units are processed in a specific fashion. For example, the Region postal address unit does not have any structural components. In order to process the component, the system can engage n-gram lookup in a table compiled from USPS, GPO (Government Printing Office) and a list of other common abbreviations (e.g. California=CA, Calif, Ca, Cal).

To determine the Postcode postal address unit (US ZIP), the system can make a statistical inference based on the number of characters in a token and a character composition derived from the statistical model set. For the Number postal address unit the system can also make a statistical inference based on the length and the character composition of the street numbers in the statistical model.

According to the postal rules, the Street postal address unit and the Wildcard postal address unit (307 in FIG. 3) have some presumed structure. The system can therefore come to certain conclusions based on the keywords (e.g. suffixes, directional markers, unit designators) present in the text. However, in practice, the prescribed postal address rules are often bent or outright non-existent. Consider, for example, the following postal address:

RIVER VIEW EXECUTIVE PLAZA BLDG 100 P.O BOX 500 NEW JERSEY 08625-0500

The above postal address is constructed from a street name and a collection of units (BLDG, PO BOX).

To accommodate for irregularities in postal addresses like the one shown above, the Bayesian surprise approach is used to compute difference between learned statistical expectations and the actual sample. Bayesian surprisal is calculated using the Kullback-Leibler ("KL") divergence:

$$D_{KL}(P \mid\mid Q) = -\Sigma_{x \in X} P(x) \log\left(\frac{Q(x)}{P(x)}\right)$$

KL divergence is computed as the logarithmic difference between the probabilities P and Q, where the expectation is taken using the probabilities P. Here P and Q are two probability distributions defined on the same probability space. When applied to the postal address mode, this translates into an increase in a veracity score when a strong indicator, such as a Street 301 street name suffix or wildcard Unit 307 designator, appears outside of a statistically determined position in a sequence of tokens which comprise a candidate postal address data object. In terms of Bayesian statistics this computation signifies transition from a prior distribution to a posterior distribution due to discovery of a new fact.

When examining sequences of tokens which comprise a candidate postal address data object (i.e., postal address units), a relative weight of the sequences of tokens is computed based on the previously established statistical model and a sequence with a highest weight ("score") is selected as a candidate for a component under consideration. The score is interpreted as a measure of confidence in associating a component instance with a component of the generic postal address model.

It is appreciated that while this specification provides KL divergence as a measure of surprisal, other measures of statistical divergence, such as Jensen-Shannon divergence, can also be utilized.

Figure 6:
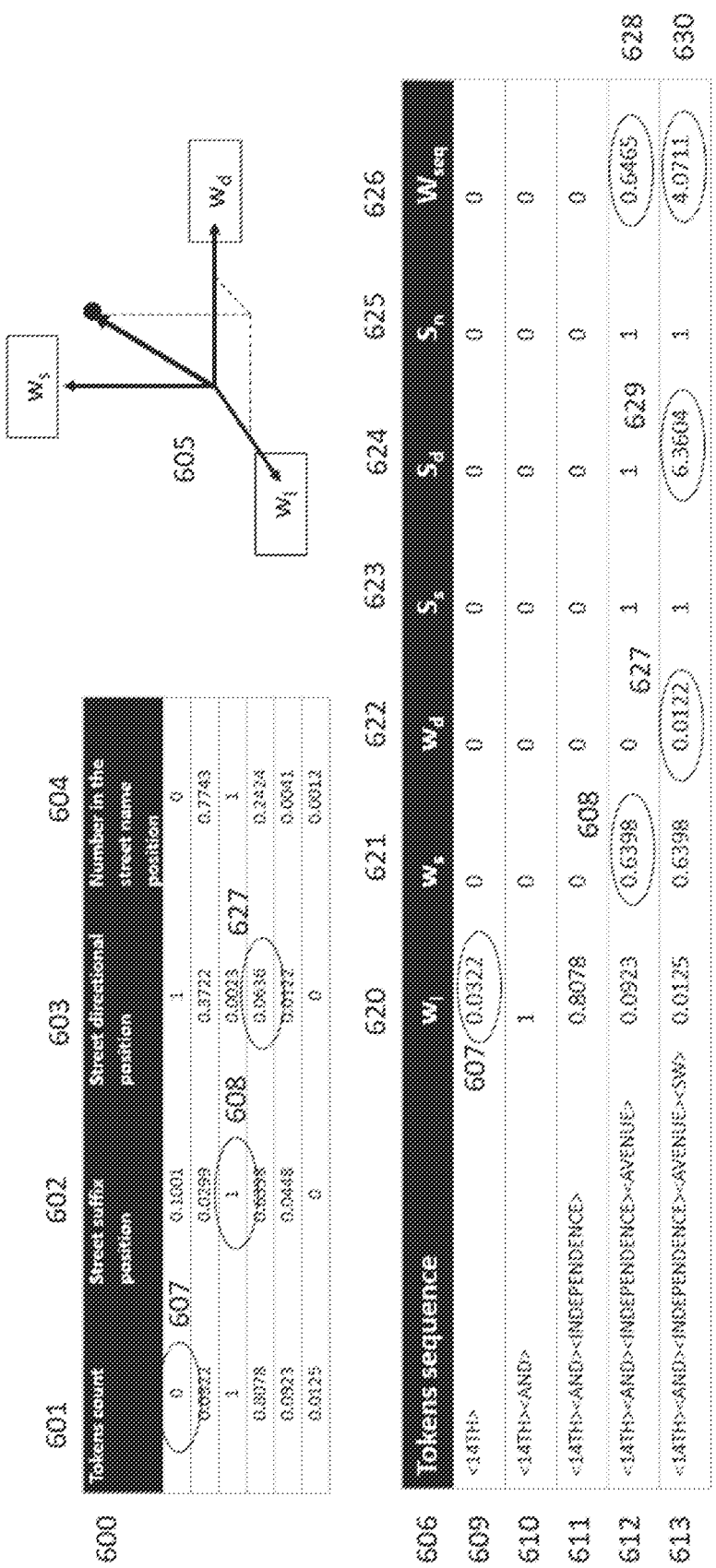
FIG. 6 illustrates an example of evaluating sequences of tokens with the statistical postal address model according to an exemplary embodiment.

FIG. 6 illustrates the step of evaluating sequences of tokens with the statistical postal address model using the Street Postal Address Unit (numeral 301 in FIG. 3) element as an example. Table 600 is an instance of a (frequentist) statistical postal address model describing the Street Postal Address Unit. The columns in the Table 600 represent normalized frequencies ("weights") of discovering a street suffix 602, a street directional 603, a number 604 at a certain position in a street name, or a count of tokens 601 comprising a street name. Table 600 is the result of step 101 in FIG. 1.

Further referring to FIG. 6, a collection of tokens, presumably comprising a street name, is passed by the Supplicant (numeral 550 in FIG. 5), in a sequential order, to the component responsible for identifying an instance of the Street Postal Address unit (301), which is the Street Oracle (numeral 553 in FIG. 5).

As discussed above, the step of evaluating the sequences of tokens with the statistical postal address model includes, for each sequence of one or more tokens, computing one or more weights associated with the sequence of one or more tokens and corresponding to one or more attributes of the at least one postal address unit (Sub-step 1). This is shown in FIG. 6 as the Street Oracle computing the weights 620-622 corresponding to different attributes of each of sequences 609-613 that are provided by the Supplicant. The weights are pulled from table 600, which stores normalized frequencies, as discussed above.

Additionally, the step of evaluating the sequences of tokens with the statistical postal address model includes, for each sequence of one or more tokens, computing one or more surprisal factors associated with the sequence of one or more tokens and corresponding to one or more attributes of the at least one postal address unit (Sub-step 2). This is shown in FIG. 6 as the Street Oracle computing the surprisal factors 623-625 corresponding to different attributes of each of sequences 609-613

The step of evaluating the sequences of tokens with the statistical postal address model further includes, for each sequence of one or more tokens, computing an overall weight associated with the sequence of one or more tokens based at least in part on the one or more weights and the one or more surprisal factors (Sub-step 3). This is shown in FIG. 6 as the Street Oracle computing the overall weight 626 of each of sequences 609-613.

Finally, the step of evaluating the sequences of tokens with the statistical postal address model further includes, for each sequence of one or more tokens, identifying the sequence of one or more tokens as corresponding to the at least one postal address unit based at least in part on the overall weight (Sub-step 4). The overall weight 626 of each of sequences 609-613 is used to make this assessment. For example, sequences 609-611 can be eliminated as potential street postal address units because their overall weight (626) is zero. Sequence 613 will be selected as the sequence corresponding to the postal address unit since it has the highest overall weight 630.

Having explained the overall process for evaluating the sequences of tokens with the statistical postal address model and the implementation of each of the sub-steps of this process, the sections below explain the specific example shown in FIG. 6 in greater detail.

A collection of tokens, presumably comprising a street name, is passed by the Supplicant, in a sequential order, to a component responsible for identifying an instance of the Street postal address unit—the Street Oracle. The Street Oracle computes the weight of a sequence presented by the Supplicant and returns a result of that computation to the Supplicant. Based on a current internal state, the Supplicant decides either to continue its dialog with Street Oracle by providing more tokens or to terminate the inquiry.

Consider the exemplary sequences of tokens shown in Table 606 submitted by the Supplicant to the Street Oracle. For illustrative purposes assume, without a limitation, that the Supplicant identified a sequence of five tokens as a potential street name in a collection of tokens presumably containing a postal address.

For each sequence of tokens 609-613, provided by the Supplicant, the Street Oracle computes an overall weight of a respective sequence $W_{seq}$ 626 as:

$$W_{seq} = \sqrt{w_l^2 + w_s^2 + w_d^2}(S_s + S_d + S_n)$$

where:

$w_l$ 620 is a weight associated with a token sequence representing a street name being of a certain length (attribute: token sequence length);

$w_s$ 621 is a weight associated with a street suffix being in a certain position of a street name (attribute: suffix position);

$w_d$ 622 is a weight associated with a street directional being in a certain position of a street name;

$S_s$ 623 is a surprisal factor that a street suffix is encountered in a last position of a street name;

$S_d$ 624 is a surprisal factor that a street directional is encountered in a last position of a street name;

$S_n$ 625 is a surprisal factor that a number is encountered in a last position of a street name;

Further referring to FIG. 6, it is appreciated that the expression:

$$w = \sqrt{w_l^2 + w_s^2 + w_d^2}$$

is a length of a vector 605 in a space formed by the respective component weights.

The value of the surprisal factor is computed using the earlier discussed Kullback-Leibler ("KL") divergence:

$$D_{KL}(P \| Q) = -\Sigma_{x \in X} P(x) \log\left(\frac{Q(x)}{P(x)}\right)$$

The probability space Q(x) is the prior expectation of the event (i.e. probability of a street suffix being in the 4th position 608) and the probability space P(x) which corresponds to our posterior knowledge of the event which took place (i.e. that a street suffix was indeed encountered in the 4th position). In a case when the prior expectation exceeds a 50% chance of being true, the event cannot be considered as being unexpected and the surprisal factor is set to be equal to 1.

The above reasoning leads us to the following formula (4) for computing the surprisal factor value:

$$S_i = \begin{cases} 1, & \text{if } q_i \geq 0.5 \\ -\log q_i \end{cases}$$

where qi is prior expectation of an event, $S_i = S_s | S_d | S_n$

Consider an exemplary street name candidate 14TH AND INDEPENDENCE AVENUE SW comprised of five tokens which the Supplicant is passing to the Street Oracle.

Referring to FIG. 6, the Supplicant initially provides the Street Oracle a token sequence 609 consisting of a single token containing a string "14TH". The weight corresponding to a street name being a single token 607 is 0.0322. This weight value corresponds to a share of one-word street names among all street names in the universe of discourse.

Since token sequence 609 does not contain any indicators of a street name, such as a street suffix 602 or a street directional 603, the Street Oracle evaluates weight of the token sequence 609 as 0. In a similar fashion, the weight of token sequences 610 and 611, which do not contain either a street suffix 602 or a street directional 603, are evaluated as 0.

Token sequence 612 contains street suffix "AVENUE" in the fourth position which corresponds to the weight value of 0.6398 (608).

Since a directional component of the street name is not present, the weight of the directional component is set to be 0 and a surprisal factor associated with it is 1. Further applying formula (4), a surprisal factor of the street suffix component is equal to 1 due to a street suffix appearing in the fourth position of a street name being a common occurrence.

To compute the weight of the token sequence 612, the Street Oracle applies formula (2) and the weight of the token sequence 612 is estimated to be 0.6465 (628).

Token sequence 613 contains street directional "SW" in the last position which corresponds to the weight value 0.0122 (627). Further integrating this value into formula (2)

and computing a surprisal factor according to formula 4, the surprisal factor of the street directional is equal to 6.3604 (629).

To compute the weight of the token sequence 613, the Street Oracle applies formula (2) and the weight of the token sequence 613 is estimated to be 4.0711 (630). Since the Supplicant has exhausted its collection of tokens, it accepts a token sequence with a largest weight, token sequence 613, as a Street name postal address unit.

In another example, consider the scenario where the street name candidate 14TH AND INDEPENDENCE AVENUE WASHINGTON comprised of five tokens is passed to the Street Oracle. In this example, last token ("WASHINGTON") is not a standard street name designator. When processing this token sequence, the Street Oracle discovers an extra non-street designator token following a valid street designator ("AVENUE") and invalidates the candidate token sequence by assigning said token sequence the weight of 0 and returning this assessment to the Supplicant.

Referring to FIG. 6, the Supplicant would compare this token sequence's weight assessment with the Street Oracle's non-zero weight assessment 0.6465 (328) of a previous token sequence 14TH AND INDEPENDENCE AVENUE and conclude that the latter token sequence is an instance of the Street postal address unit. Note that it would not compare with the overall weight of sequence 613 because, in this example, the 14TH AND INDEPENDENCE AVENUE SW is not received.

In the scenario where there are more tokens following a last token in the token sequence 14TH AND INDEPENDENCE AVENUE WASHINGTON, the Supplicant presents the Street Oracle with those longer token sequences. If the Street Oracle rejects the newly proposed sequences, the Supplicant would establish the token sequence 14TH AND INDEPENDENCE AVENUE as an instance of the Street postal address unit. If the Street Oracle evaluates one or more newly proposed sequences higher than token sequence 14TH AND INDEPENDENCE AVENUE, the Supplicant would establish the latest newly proposed token sequence as an instance of the Street postal address unit. In the event of a tie, the Supplicant selects the longest sequence with a non-zero weight as an instance of the Street postal address unit.

Figure 7:
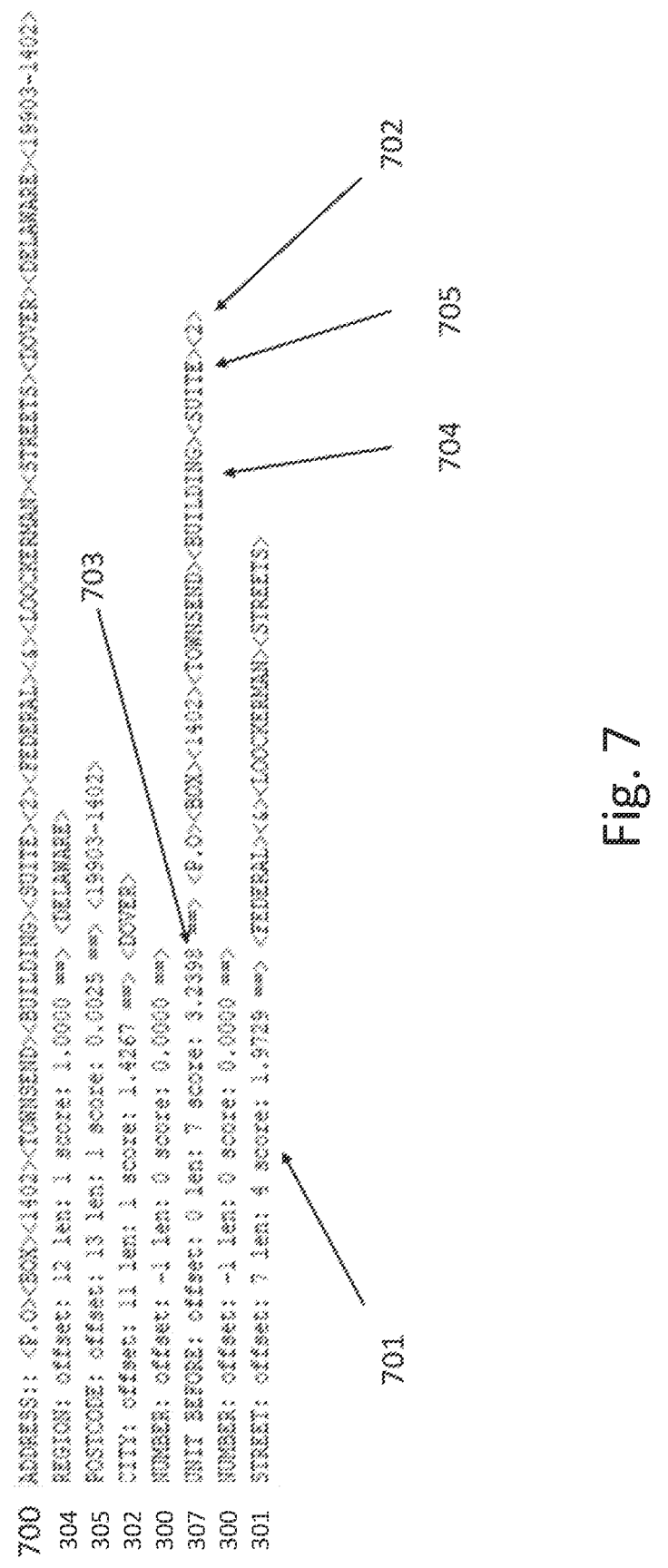

FIG. 7 illustrates an example of application of the scoring system and the effect of Bayesian surprise according to an exemplary embodiment. Specifically, FIG. 7 illustrates the effect of Bayesian surprise on the Wildcard Postal Address Unit (numeral 307 in FIG. 3) computation when evaluating sequences of tokens with the statistical model.

Referring to FIG. 7 (and FIG. 3), the Address 700 is comprised of the Region (304), Postcode (305), City (302), Street (301), Number (300), and Wildcard Unit (307) components. Each of the components is assigned a Score Value 701.

As shown in FIG. 7, an unusually long unit designator 702 ("P.O. BOX 1402 TOWNSEND BUILDING SUITE 2") is assigned a high Score Value 703 (3.24). This phenomenon is due to a fact that, statistically, the probability of a unit designator being 7 tokens long is very low but presence of standard unit designators "BUILDING" 704 and "SUITE" 705 at offsets 5 and 6 respectively, significantly increases our confidence in presence of an abnormally long unit designator.

It is appreciated that a novel approach proposed herein exhibits the ability to learn because postal addresses like 700 were not present in the data set from which the (frequentist) statistical postal address model was derived.

Returning to FIG. 1, the result of the evaluation step 104 is that at least one candidate postal address data object is identified. At step 105 at least one candidate vector corresponding to the identified at least one candidate postal address data object is computed in the vector space. As explained previously, the vector space describes a universe of postal addresses found in a plurality of training postal addresses according to the statistical postal address model, is clustered into a plurality of clusters, and includes multiple training vectors corresponding to multiple training postal addresses in the plurality of training postal addresses.

The process for computing the at least one candidate vector is similar to the process for computing the training vectors, described previously. The primary difference is that, rather than computing or generating vectors based upon the training postal addresses, the vectors are computed based upon the candidate postal address data objects determined in step 104.

Step 105 can be implemented by computing a candidate vector space describing a universe of postal addresses found in the plurality of training postal addresses according to the statistical postal address model and including the multiple training vectors, as well as the computed at least one candidate vector within the candidate vector space. In this case, the candidate vector space of candidate vectors is superimposed on the vector space including the training vectors and clusters.

Figure 8:
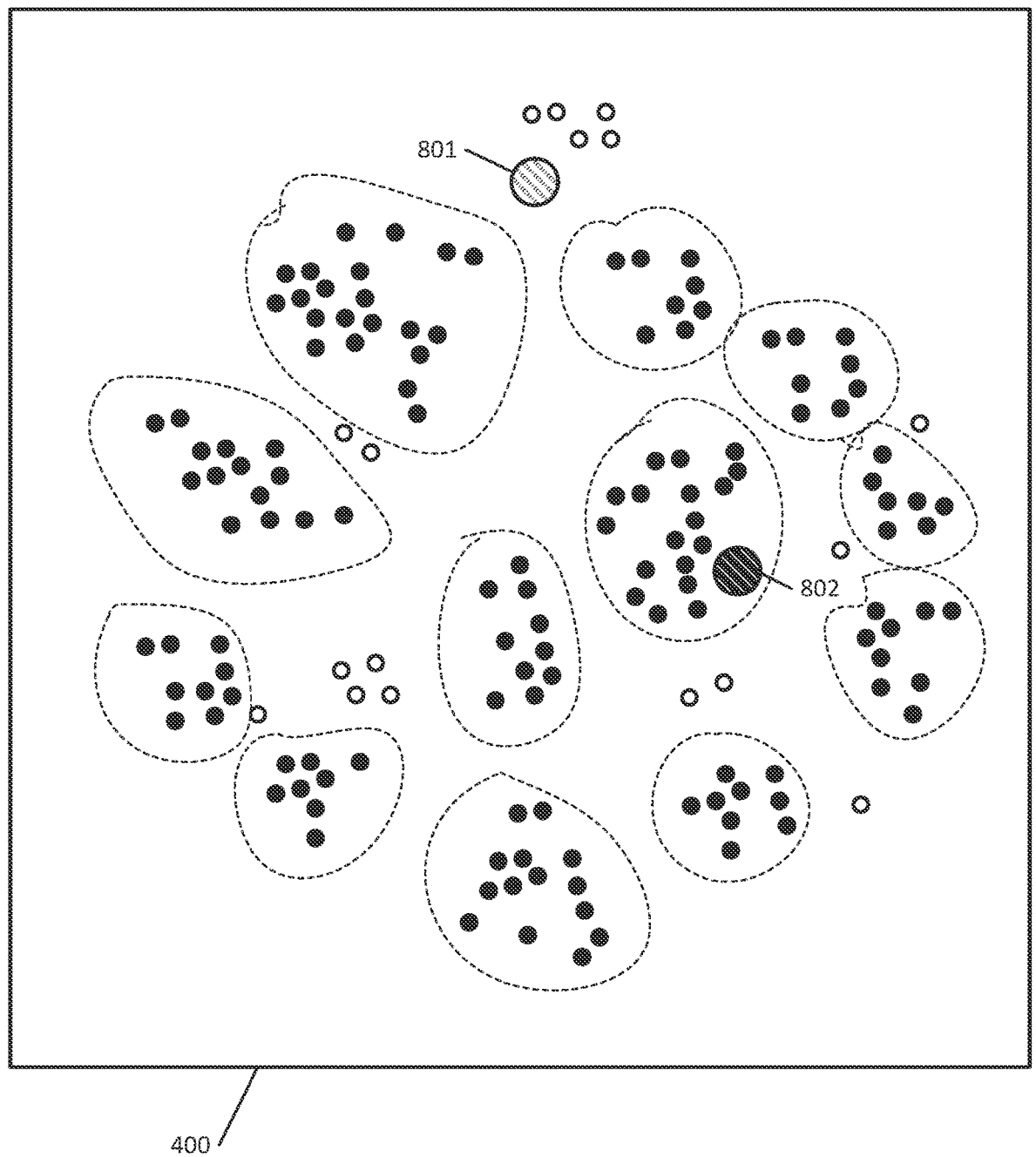
FIG. 8 illustrates the vector space of postal addresses including vectors describing candidate postal address objects according to an exemplary embodiment.

FIG. 8 illustrates the vector space 400 of postal addresses including vectors describing candidate postal address data objects according to an exemplary embodiment. As shown in FIG. 8, vector 801 and vector 802 have been added to the vector space 400. Each of vector 801 and vector 802 correspond to a candidate postal address data object identified by the step of the evaluating the one or more sequences of one or more tokens with the statistical postal address model. The vectors for each of these candidate postal address data objects are computed by determining the feature and attribute values of each postal address unit within the candidate postal address data objects, similar to the process applied to training postal addresses.

Returning to FIG. 1, at step 106 it is determined whether the identified at least one candidate postal address data object corresponds to a valid postal address based at least in part on applying one or more outlier detection methods to the at least one candidate vector and one or more clusters in the plurality of clusters.

This step includes applying the one or more outlier detection methods to the at least one candidate vector and the one or more clusters to determine whether the at least one candidate vector is an outlier relative to the one or more clusters and determining that the at least one candidate postal address data object corresponds to an actual postal address based at least in part on a determination that the at least one candidate vector is not an outlier.

Applying the one or more outlier detection methods can include a single outlier detection method or applying an ensemble of outlier detection methods. For example, the ensemble can includes distance (Mahalanobis distance), density (Local Outlier Factor—LOF) and statistical (Grubb's test) outlier detection methods. Each of these methods are described in greater detail below.

The Mahalanobis distance is a measure of the distance between a point P and a distribution D. An origin point for computing this measure is at the centroid (the center of mass) of each of the clusters. The first coordinate axis when computing this distance extends along the spine of the training vectors within each cluster, which is any direction in which the variance is the greatest. The second coordinate axis, extends perpendicularly to the first axis, with the origin point at the intersection of first axis and the second axis. The Mahalanobis distance for each candidate vector and each cluster is the distance measured relative to coordinate axes and from the candidate vector to the origin point.

The distance-based outlier detection confidence metric can be calculated as:

$$C_{MOA} = 100 p_e / [1 - p_{crit}(\delta, n, p_e)]$$

where $p_{crit}(\delta, n, p)$ is a critical value for distinguishing between the outliers and the extremes using an algorithm proposed by P. Filzmoser. A decision is made based on a measure of difference between the empirical and the theoretical distribution in the tails of the distribution and is considered as a measure of the outliers in a collection of the clusters.

Local Outlier Factor ("LOF") is based on local density of vectors. The locality of each vector is given by k nearest neighbors, whose distance is used to estimate the density. By comparing the local density of an object to the local densities of its neighbors, regions of similar density can be identified, as well as points that have a lower density than their neighbors. These are considered to be outliers.

Density-based outlier detection is performed by evaluating distance from a given node to its K Nearest Neighbors ("K-NN"). The K-NN method computes a Euclidean distance matrix for all vectors in the vector space and then evaluates local reachability distance from each vector to its K nearest neighbors. Based on the said distance matrix local reachability distance, density is computed for each vector and the Local Outlier Factor ("LOF") for each vector is determined. Vectors with large LOF value are considered as the outlier candidates.

The density-based cluster outlier confidence metric can be computed as:

$$C_{LOF} = 100 \frac{LOF}{t_{LOF}}$$

where LOF— is a computed local outlier factor, t_LOF— an empirical LOF threshold value. Vectors with a higher computed LOF value are considered as outliers.

Grubbs' Test can be applied to results of outlier detection with the purpose of a further quantification of the degree of irregularity of the outlying vectors.

The Grubbs' test can be used to detect a single outlier in a collection of clusters created during the clustering step. The Grubb's test can be applied for further validation of the results of the MOA and the LOF evaluations.

Grubbs' test confidence metric can be computed as:

$$C_{Grb} = 100 \frac{G}{G_{crit}}$$

where G is a Grubbs' test statistic and $G_{crit}$ is a threshold value for rejecting the "no outliers" hypothesis (a "null hypothesis") for a one-sided test.

Based on one or more the above techniques, candidate postal address data objects having candidate vectors which outlier detection methods indicate as outliers are rejected. Those postal address candidate objects which pass the outlier detection tests are accepted as true postal addresses. A variety of metrics can be used to compute distance from a candidate vector to a cluster. For example, the Hausdorff metric can be to compute distance between a candidate vector (corresponding to a candidate postal address data object) and the respective clusters of the training vectors (corresponding to training postal addresses).

It is appreciated that other outlier detection methods and distance metrics other than those described above can also be utilized. For example, a metric of the PSDML (point-to-set distance metric learning) class can be used as a distance metric. Yet another approach to determining if a candidate postal address data object is an outlier is by adding it to the vector space and then re-clustering the combined training and candidate vectors to determine if the candidate postal address data object is identified as a previously unknown noise point. Minimum Covariance Determination algorithm or a "Kernel Trick" method can also be used for outlier cluster detection.

As discussed earlier, FIG. 8 illustrates an example of vector space 400 with candidate vectors 801 and 802 corresponding to candidate postal address data objects. In this example, the candidate postal address data object corresponding to vector 801 is rejected as an outlier, whereas candidate postal address data object corresponding to vector 802 is accepted as a postal address, since vector 801 is an outlier and vector 802 is not an outlier.

Figure 9:
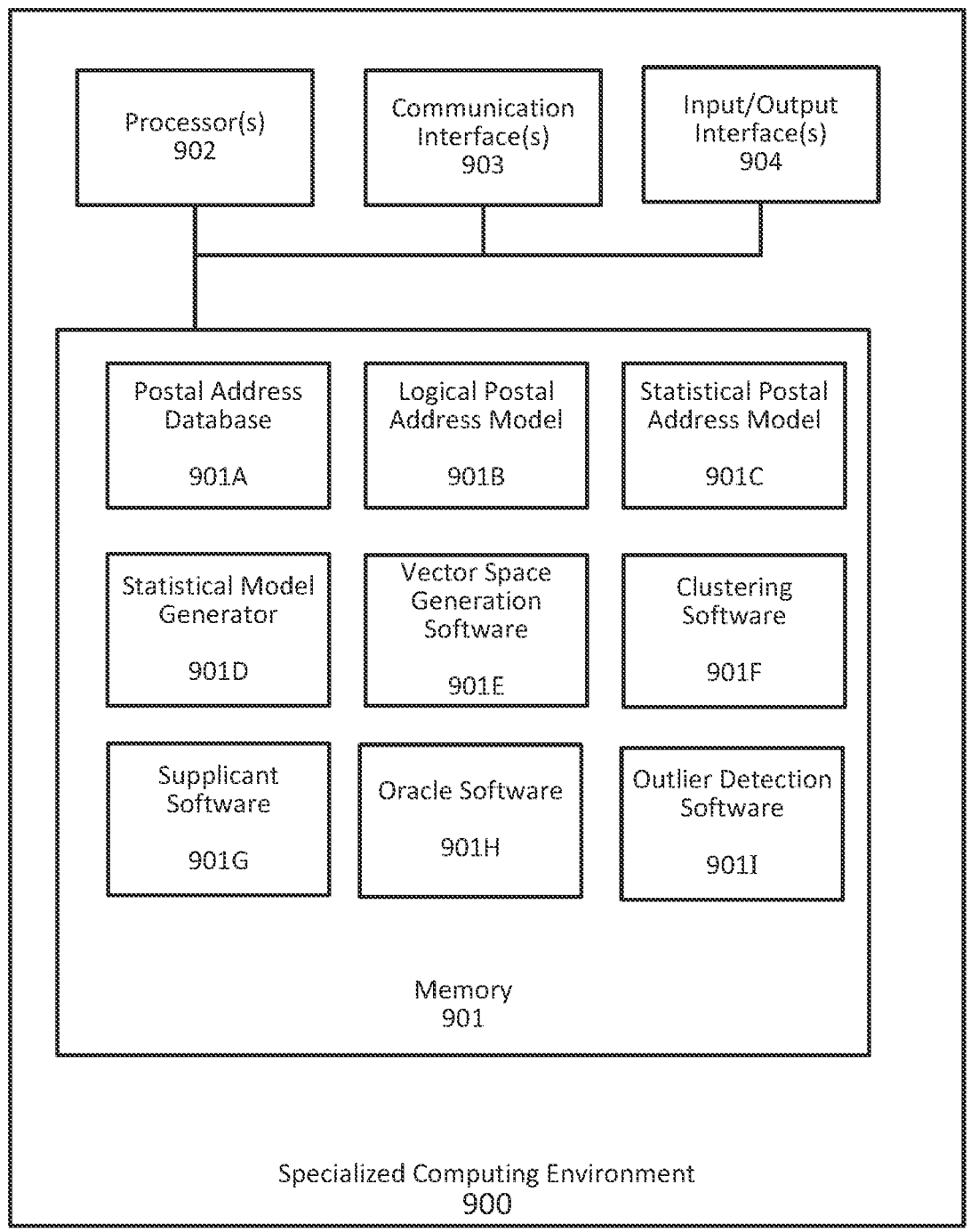
FIG. 9 illustrates the components of the specialized computing environment for postal address identification according to an exemplary embodiment.

FIG. 9 illustrates the components of the specialized computing environment 900 configured to perform the processes described herein. Specialized computing environment 900 is a computing device that includes a memory 901 that is a non-transitory computer-readable medium and can be volatile memory (e.g., registers, cache, RAM), non-volatile memory (e.g., ROM, EEPROM, flash memory, etc.), or some combination of the two.

As shown in FIG. 9, memory 901 can include a postal address database 901A storing the training data, logical postal address model 901B, statistical postal address model 901C, statistical model generator 901D, vector space generation software 901E, clustering software 901F, supplicant software 901G, oracle software 901H, outlier detection software 901I. Each of the software components in memory 901 store specialized instructions and data structures configured to perform the corresponding functionality and techniques described herein. Optionally, the postal address database 901A can be an external database and only a portion of the database corresponding to the subset is stored in memory 901.

All of the software stored within memory 901 can be stored as a computer-readable instructions, that when executed by one or more processors 902, cause the processors to perform the functionality described with respect to FIGS. 1-8.

Processor(s) 902 execute computer-executable instructions and can be a real or virtual processors. In a multi-processing system, multiple processors or multicore processors can be used to execute computer-executable instructions to increase processing power and/or to execute certain software in parallel.

Specialized computing environment 900 additionally includes a communication interface 903, such as a network interface, which is used to communicate with devices, applications, or processes on a computer network or computing system, collect data from devices on a network, and implement encryption/decryption actions on network communications within the computer network or on data stored in databases of the computer network. The communication interface conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Specialized computing environment 900 further includes input and output interfaces 904 that allow users (such as system administrators) to provide input to the system to display information, to edit data stored in memory 901, or to perform other administrative functions.

An interconnection mechanism (shown as a solid line in FIG. 9), such as a bus, controller, or network interconnects the components of the specialized computing environment 900.

Input and output interfaces 904 can be coupled to input and output devices. For example, Universal Serial Bus (USB) ports can allow for the connection of a keyboard, mouse, pen, trackball, touch screen, or game controller, a voice input device, a scanning device, a digital camera, remote control, or another device that provides input to the specialized computing environment 900.

Specialized computing environment 900 can additionally utilize a removable or non-removable storage, such as magnetic disks, magnetic tapes or cassettes, CD-ROMs, CD-RWs, DVDs, USB drives, or any other medium which can be used to store information and which can be accessed within the specialized computing environment 900.

Applicant has discovered a novel method, apparatus, and computer-readable medium, including a novel logical postal address model, computation of a statistical model for the logical postal address model, and process for discovery of the postal address data objects. The present system provides many advantages, as described below.

The present system utilizes a locality independent model of a postal address which augments a skeleton address model with one or more "unit" objects capable of carrying non-standard components of a postal address (e.g. "P.O BOX 500 TOWNSEND BUILDING SUITE 2 FEDERAL & LOCKERMAN STREETS DELAWARE"). Unlike technologies that rely on a computed distance metric between the keywords within an address and a certain order of the parameters, the novel methods disclosed herein assesses a candidate sample as a whole.

The present system utilizes an unsupervised machine learning approach which combines a frequentist statistical model derived from a large test corpus and a Bayesian model which accounts for anomalous data objects under consideration. A combination of these two models enables discovery of complex address structures which fall outside of a pure frequentist statistical model and may contain out of order token sequences (e.g. swapped postal code and region). This is superior to technologies which combine a set of rules with some minimal statistical information, which expect the postal addresses to comply to a predefined grammar, or which rely on some supervised machine learning technique.

The present system postal address model is locality independent. The disclosed techniques technique does not look for any patterns, such as those encoded using locality specific regular expressions, in the data beyond those identified during the statistical analysis step. This provides advantages over technologies, which use statistical information but also rely on locality specific patterns expressed as a collection of rules and regular expressions.

Upon completing the training step and derivation of a locality specific statistical model, the present system involves building a vector space and partitioning said vector space using a cluster analysis technique. Previously unseen candidate objects, represented by respective vectors, are matched with the previously computed clusters and a determination is made if a candidate is a member of any cluster representing a subset of addresses. Such approach enables high speed determination if a given candidate object represents an address or not. There are no existing technologies that utilize a vector space or clustering to determine that a candidate data object corresponds to an address.

The present system combines frequentist and Bayesian statistical methods. A combination of two statistical approaches enables discovery of postal addresses with anomalous syntax such as transposed, abnormally long, or non-standard postal address elements.

An exemplary implementation of the proposed approach demonstrated its accuracy and robustness. A test set, comprised of an assortment of documents retrieved from a publicly available collection of the US Government documents, contained 128 previously unseen postal addresses. The test set was manually curated and, upon completion of a test run, an accuracy score measuring precision and recall (the F1 score) was computed. For the F1 score computation purposes, the samples with improperly identified components were counted as false negatives (e.g. Street number identified as a Unit number). When applied to the said test set F1=0.94 has been achieved (116 true positives, 12 false negatives). In a separate performance test, a processing speed of approximately 15,000 postal addresses per second (374.5 K postal addresses in 25.0 seconds) was demonstrated.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiment shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A method executed by one or more computing devices for postal address identification, the method comprising:
   receiving, by at least one of the one or more computing devices, one or more sequences of one or more tokens corresponding to one or more candidate postal address data objects;
   evaluating, by at least one of the one or more computing devices, the one or more sequences of one or more tokens with a statistical postal address model to identify at least one candidate postal address data object in the one or more candidate postal address data objects that corresponds to at least one postal address unit in a plurality of postal address units, wherein each postal address unit corresponds to a distinct element of a postal address;
   computing, by at least one of the one or more computing devices, at least one candidate vector corresponding to the identified at least one candidate postal address data object in a vector space, the vector space describing a universe of postal addresses found in a plurality of training postal addresses according to the statistical postal address model and being clustered into a plurality of clusters, wherein the vector space comprises multiple training vectors corresponding to multiple training postal addresses in the plurality of training postal addresses; and determining, by at least one of the one or more computing devices, whether the identified at least one candidate postal address data object corresponds to a postal address based at least in part on applying one or more outlier detection methods to the at least one candidate vector and one or more clusters in the plurality of clusters.

2. The method of claim 1, wherein the plurality of postal address units comprise a number, a street, a city, a district, a region, a postcode, a country, and a wildcard unit.

3. The method of claim 1, further comprising, prior to receiving the one or more sequences of one or more tokens corresponding to one or more candidate postal address data objects:

generating, by at least one of the one or more computing devices, the statistical postal address model by compiling statistical information corresponding to each postal address unit in a plurality of postal address units based on the plurality of training postal addresses; and computing, by at least one of the one or more computing devices, the vector space describing the universe of postal addresses found in the plurality of training postal addresses according to the statistical postal address model and clustering the vector space into the plurality of clusters.

4. The method of claim 3, wherein the statistical postal address model comprises one or more attributes corresponding to each postal address unit in the plurality of postal address units and wherein generating a statistical postal address model by compiling statistical information corresponding to each postal address unit in a plurality of postal address units based on a plurality of training postal addresses comprises:

determining one or more values of one or more features of each postal address unit based at least in part on the plurality of training postal addresses; and determining one or more probability values for one or more attributes associated with each postal address unit based at least in part on the determined one or more values.

5. The method of claim 1, wherein the multiple training vectors correspond to a subset of training postal addresses randomly sampled from the plurality of training postal addresses.

6. The method of claim 1, wherein evaluating the one or more sequences of one or more tokens with the statistical postal address model to identify at least one candidate postal address data object in the one or more candidate postal address data objects that corresponds to at least one postal address unit in the plurality of postal address units comprises, for each sequence of one or more tokens:

computing one or more weights associated with the sequence of one or more tokens and corresponding to one or more attributes of the at least one postal address unit;

computing one or more surprisal factors associated with the sequence of one or more tokens and corresponding to one or more attributes of the at least one postal address unit;

computing an overall weight associated with the sequence of one or more tokens based at least in part on the one or more weights and the one or more surprisal factors; and identifying the sequence of one or more tokens as corresponding to the at least one postal address unit based at least in part on the overall weight.

7. The method of claim 1, wherein determining whether the identified at least one candidate postal address data object corresponds to a postal address based at least in part on applying one or more outlier detection methods to the at least one candidate vector and one or more clusters in the plurality of clusters comprises:

applying the one or more outlier detection methods to the at least one candidate vector and the one or more clusters to determine whether the at least one candidate vector is an outlier; and determining that the at least one candidate postal address data object corresponds to a postal address based at least in part on a determination that the at least one candidate vector is not an outlier.

8. The method of claim 1, wherein the one or more outlier detection methods comprise one or more of: Mahalanobis distance, Local Outlier Factor, Grubb's test, or Hausdorff metric.

9. An apparatus for postal address identification, the apparatus comprising:

one or more processors; and one or more memories operatively coupled to at least one of the one or more processors and having instructions stored thereon that, when executed by at least one of the one or more processors, cause at least one of the one or more processors to:

receive one or more sequences of one or more tokens corresponding to one or more candidate postal address data objects;

evaluate the one or more sequences of one or more tokens with a statistical postal address model to identify at least one candidate postal address data object in the one or more candidate postal address data objects that corresponds to at least one postal address unit in a plurality of postal address units, wherein each postal address unit corresponds to a distinct element of a postal address;

compute at least one candidate vector corresponding to the identified at least one candidate postal address data object in a vector space, the vector space describing a universe of postal addresses found in a plurality of training postal addresses according to the statistical postal address model and being clustered into a plurality of clusters, wherein the vector space comprises multiple training vectors corresponding to multiple training postal addresses in the plurality of training postal addresses; and determine whether the identified at least one candidate postal address data object corresponds to a postal address based at least in part on applying one or more outlier detection methods to the at least one candidate vector and one or more clusters in the plurality of clusters.

10. The apparatus of claim 9, wherein the plurality of postal address units comprise a number, a street, a city, a district, a region, a postcode, a country, and a wildcard unit.

11. The apparatus of claim 9, wherein at least one of the one or more memories has further instructions stored thereon that, when executed by at least one of the one or more processors, cause at least one of the one or more processors to, prior to receiving the one or more sequences of one or more tokens corresponding to one or more candidate postal address data objects:

generate the statistical postal address model by compiling statistical information corresponding to each postal address unit in a plurality of postal address units based on the plurality of training postal addresses; and compute the vector space describing the universe of postal addresses found in the plurality of training postal addresses according to the statistical postal address model and clustering the vector space into the plurality of clusters.

12. The apparatus of claim 11, wherein the statistical postal address model comprises one or more attributes corresponding to each postal address unit in the plurality of postal address units and wherein the instructions that, when executed by at least one of the one or more processors, cause at least one of the one or more processors to generate a statistical postal address model by compiling statistical information corresponding to each postal address unit in a plurality of postal address units based on a plurality of training postal addresses further cause at least one of the one or more processors to:

determine one or more values of one or more features of each postal address unit based at least in part on the plurality of training postal addresses; and determine one or more probability values for one or more attributes associated with each postal address unit based at least in part on the determined one or more values.

13. The apparatus of claim 9, wherein the multiple training vectors correspond to a subset of training postal addresses randomly sampled from the plurality of training postal addresses.

14. The apparatus of claim 9, wherein the instructions that, when executed by at least one of the one or more processors, cause at least one of the one or more processors to evaluate the one or more sequences of one or more tokens with the statistical postal address model to identify at least one candidate postal address data object in the one or more candidate postal address data objects that corresponds to at least one postal address unit in the plurality of postal address units further cause at least one of the one or more processors to, for each sequence of one or more tokens:

compute one or more weights associated with the sequence of one or more tokens and corresponding to one or more attributes of the at least one postal address unit;

compute one or more surprisal factors associated with the sequence of one or more tokens and corresponding to one or more attributes of the at least one postal address unit;

compute an overall weight associated with the sequence of one or more tokens based at least in part on the one or more weights and the one or more surprisal factors; and identify the sequence of one or more tokens as corresponding to the at least one postal address unit based at least in part on the overall weight.

15. The apparatus of claim 9, wherein the instructions that, when executed by at least one of the one or more processors, cause at least one of the one or more processors to determine whether the identified at least one candidate postal address data object corresponds to a postal address based at least in part on applying one or more outlier detection methods to the at least one candidate vector and one or more clusters in the plurality of clusters further cause at least one of the one or more processors to:

apply the one or more outlier detection methods to the at least one candidate vector and the one or more clusters to determine whether the at least one candidate vector is an outlier; and determine that the at least one candidate postal address data object corresponds to a postal address based at least in part on a determination that the at least one candidate vector is not an outlier.

16. The apparatus of claim 9, wherein the one or more outlier detection methods comprise one or more of: Mahalanobis distance, Local Outlier Factor, Grubb's test, or Hausdorff metric.

17. At least one non-transitory computer-readable medium storing computer-readable instructions for postal address identification that, when executed by one or more computing devices, cause at least one of the one or more computing devices to:

receive one or more sequences of one or more tokens corresponding to one or more candidate postal address data objects;

evaluate the one or more sequences of one or more tokens with a statistical postal address model to identify at least one candidate postal address data object in the one or more candidate postal address data objects that corresponds to at least one postal address unit in a plurality of postal address units, wherein each postal address unit corresponds to a distinct element of a postal address;

compute at least one candidate vector corresponding to the identified at least one candidate postal address data object in a vector space, the vector space describing a universe of postal addresses found in a plurality of training postal addresses according to the statistical postal address model and being clustered into a plurality of clusters, wherein the vector space comprises multiple training vectors corresponding to multiple training postal addresses in the plurality of training postal addresses; and determine whether the identified at least one candidate postal address data object corresponds to a postal address based at least in part on applying one or more outlier detection methods to the at least one candidate vector and one or more clusters in the plurality of clusters.

18. The at least one non-transitory computer-readable medium of claim 17, wherein the plurality of postal address units comprise a number, a street, a city, a district, a region, a postcode, a country, and a wildcard unit.

19. The at least one non-transitory computer-readable medium of claim 17, further storing computer-readable instructions that, when executed by at least one of the one or more computing devices, cause at least one of the one or more computing devices to, prior to receiving the one or more sequences of one or more tokens corresponding to one or more candidate postal address data objects:

generate the statistical postal address model by compiling statistical information corresponding to each postal address unit in a plurality of postal address units based on the plurality of training postal addresses; and compute the vector space describing the universe of postal addresses found in the plurality of training postal addresses according to the statistical postal address model and clustering the vector space into the plurality of clusters.

20. The at least one non-transitory computer-readable medium of claim 19, wherein the statistical postal address model comprises one or more attributes corresponding to each postal address unit in the plurality of postal address units and wherein the instructions that, when executed by at least one of the one or more computing devices, cause at least one of the one or more computing devices to generate a statistical postal address model by compiling statistical information corresponding to each postal address unit in a plurality of postal address units based on a plurality of training postal addresses further cause at least one of the one or more computing devices to:
    determine one or more values of one or more features of each postal address unit based at least in part on the plurality of training postal addresses; and
    determine one or more probability values for one or more attributes associated with each postal address unit based at least in part on the determined one or more values.

21. The at least one non-transitory computer-readable medium of claim 17, wherein the multiple training vectors correspond to a subset of training postal addresses randomly sampled from the plurality of training postal addresses.

22. The at least one non-transitory computer-readable medium of claim 17, wherein the instructions that, when executed by at least one of the one or more computing devices, cause at least one of the one or more computing devices to evaluate the one or more sequences of one or more tokens with the statistical postal address model to identify at least one candidate postal address data object in the one or more candidate postal address data objects that corresponds to at least one postal address unit in the plurality of postal address units further cause at least one of the one or more computing devices to, for each sequence of one or more tokens:
    compute one or more weights associated with the sequence of one or more tokens and corresponding to one or more attributes of the at least one postal address unit;
    compute one or more surprisal factors associated with the sequence of one or more tokens and corresponding to one or more attributes of the at least one postal address unit;
    compute an overall weight associated with the sequence of one or more tokens based at least in part on the one or more weights and the one or more surprisal factors; and
    identify the sequence of one or more tokens as corresponding to the at least one postal address unit based at least in part on the overall weight.

23. The at least one non-transitory computer-readable medium of claim 17, wherein the instructions that, when executed by at least one of the one or more computing devices, cause at least one of the one or more computing devices to determine whether the identified at least one candidate postal address data object corresponds to a postal address based at least in part on applying one or more outlier detection methods to the at least one candidate vector and one or more clusters in the plurality of clusters further cause at least one of the one or more computing devices to:
    apply the one or more outlier detection methods to the at least one candidate vector and the one or more clusters to determine whether the at least one candidate vector is an outlier; and
    determine that the at least one candidate postal address data object corresponds to a postal address based at least in part on a determination that the at least one candidate vector is not an outlier.

24. The at least one non-transitory computer-readable medium of claim 17, wherein the one or more outlier detection methods comprise one or more of: Mahalanobis distance, Local Outlier Factor, Grubb's test, or Hausdorff metric.

* * * * *